US007165884B2

(12) United States Patent
O'Dea et al.

(10) Patent No.: US 7,165,884 B2
(45) Date of Patent: Jan. 23, 2007

(54) GRID ASSEMBLY FOR USE WITH A CASSETTE

(75) Inventors: Dennis James O'Dea, Farmington, NY (US); Xiaohui Wang, Pittsford, NY (US); Salvatore Castrenze DeFazio, Bergen, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/115,435

(22) Filed: Apr. 27, 2005

(65) Prior Publication Data

US 2006/0222149 A1    Oct. 5, 2006

Related U.S. Application Data

(60) Provisional application No. 60/668,547, filed on Apr. 5, 2005.

(51) Int. Cl.
    *G03B 42/04*   (2006.01)
(52) U.S. Cl. ....................................... 378/186
(58) Field of Classification Search ............... 378/155, 378/186, 154, 167, 181, 204
    See application file for complete search history.

(56) References Cited

U.S. PATENT DOCUMENTS

| 3,829,698 | A | * | 8/1974 | Goetz | 378/181 |
|---|---|---|---|---|---|
| 3,846,635 | A | | 11/1974 | Shaffer | 378/187 |
| 4,429,412 | A | | 1/1984 | Pierce et al. | 378/165 |
| 4,589,124 | A | | 5/1986 | Ruiz | 378/178 |
| 5,441,251 | A | * | 8/1995 | Ohta | 378/188 |
| 6,398,409 | B1 | | 6/2002 | Brooks | 378/209 |
| 6,744,062 | B1 | | 6/2004 | Brahm et al. | |
| 6,843,598 | B1 | | 1/2005 | Minnigh et al. | |
| 6,852,987 | B1 | | 2/2005 | Steklenski et al. | |
| 2002/0090055 | A1 | * | 7/2002 | Zur et al. | 378/154 |
| 2004/0141589 | A1 | | 7/2004 | Sharpensteen et al. | 378/177 |

FOREIGN PATENT DOCUMENTS

| GB | 683408 | 11/1952 |
|---|---|---|
| JP | 10282598 | 10/1998 |
| JP | 2003162019 | 6/2003 |
| WO | 03/081335 | 10/2003 |

* cited by examiner

*Primary Examiner*—Courtney Thomas
(74) *Attorney, Agent, or Firm*—Susan L. Parulski

(57) ABSTRACT

A grid assembly for use with an imaging cassette, for example, a computed radiography cassette, particularly an elongated radiography cassette. The grid assembly includes: an anti-scatter grid; a radiographically translucent enclosure housing the anti-scatter grid and having two ends; a transport member disposed proximate a first end of the enclosure; at least one roller disposed proximate a second end of the enclosure; and a receiving member attached to the enclosure and adapted to removably receive and secure the imaging cassette.

9 Claims, 6 Drawing Sheets

GRID ASSEMBLY FOR USE WITH A CASSETTE

CROSS REFERENCE TO RELATED APPLICATION

Reference is made to, and priority is claimed from, provisional patent application U.S. Ser. No. 60/668,547 entitled "GRID ASSEMBLY FOR A CR CASSETTE", filed on Apr. 5, 2005 in the name of O'Dea et al., which is assigned to the assignee of this application, and incorporated herein by reference.

FIELD OF THE INVENTION

The invention relates generally to medical imaging, and in particular to the field of computer radiography. More specifically, the invention relates to a storage phosphor cassette used for computer radiography.

BACKGROUND OF THE INVENTION

In conventional film-screen radiography, an object, such as a patient's body part, is exposed to x-rays projected through the object to the film-screen to produce a latent x-ray image of the object in the film. The film is then processed with chemicals or heat to produce a visual x-ray image for analysis by a medical practitioner. Computed radiography (CR) eliminates the necessity of developing film with chemicals or heat by producing a latent x-ray image in a storage phosphor which is subsequently scanned to produce a digital radiographic image that can be viewed on an electronic display. The storage phosphor can then be erased and reused.

Typically, the storage phosphor (often referred to as a storage phosphor screen or storage phosphor plate) is contained in a light tight cassette. The cassette containing an exposed storage phosphor is presented to a storage phosphor reader (also referred to as a CR reader) where the exposed storage phosphor is removed from the cassette, scanned to produce a digital image, erased, and replaced in the cassette.

Most CR systems sold in the industry will process four standard cassette sizes. (18×24 cm, 24×30 cm, 35×35 cm, and 35×43 cm). While these sizes are adequate to satisfy most of the requirements of a typical radiography department, such conventional size CR cassettes are limited in size and so may be unsuitable for imaging elongated body regions, such as the full spine or a leg.

Various solutions have been proposed for imaging an elongated body region using a CR screen/plate. One example is U.S. Pat. No. 6,852,987 (Steklenski), commonly assigned and incorporated herein by reference, which is directed to an elongated computed radiography cassette. Another examples is U.S. Pat. No. 6,744,062 (Brahm), commonly assigned and incorporated herein by reference, which is directed to an apparatus for radiographically imaging elongated objects wherein the apparatus is adapted to support a CR plate in overlapping arrangement with a cassette housing a CR plate. Other solutions have been proposed, for example see U.S. Pat. No. 6,843,598 (Minnigh).

It may be desirable to have such cassette/apparatus be portable. However, such cassettes/apparatus can be heavy and/or cumbersome because of their elongated configuration. As such, there exists a need for a portable solution for the imaging of an elongated body region using CR technology.

The present invention provides means for porting an elongated CR cassette/apparatus.

SUMMARY OF THE INVENTION

An object of the present invention is to means for providing a portable elongated computed radiography cassette or apparatus.

Another object of the present invention is to provide a portable grid assembly for use with a cassette, particularly an elongated cassette.

These objects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to one aspect of the invention, there is provided a grid assembly for use with an imaging cassette, for example, a computed radiography cassette, particularly an elongated radiography cassette. The grid assembly includes: an anti-scatter grid; a radiographically translucent enclosure housing the anti-scatter grid and having two ends and two sides; a transport member disposed at a first end of the enclosure; at least one roller disposed at a second end of the enclosure; and a receiving member attached to the enclosure and adapted to removably receive and secure the imaging cassette.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF THE INVENTION

Figure 1:
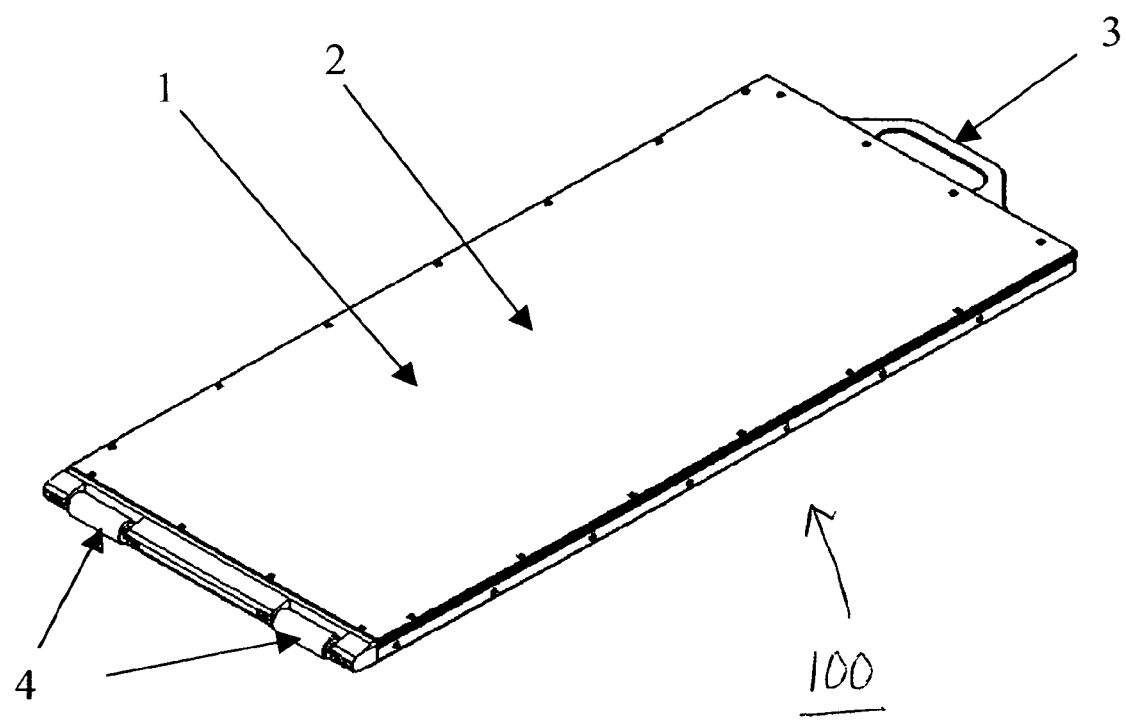
FIG. 1 shows a diagrammatic top perspective view of a grid assembly in accordance with the present invention, including rollers to assist transport.

The following is a detailed description of the preferred embodiments of the invention, reference being made to the drawings in which the same reference numerals identify the same elements of structure in each of the several figures.

The radiographic assessment of scoliosis patients typically includes erect anteroposterior and lateral views of the entire spine. Traditionally, this has been accomplished with a film/screen radiograph that is approximately 36 inches in length. When performing this type of imaging using CR, standard size cassettes may not offer a sufficient image area to image the body part of interest. As indicated above, elongated cassettes/apparatus can be employed wherein CR plates may are overlapped.

As indicated above, such elongated cassettes/apparatus can be cumbersome because of their elongated configuration.

In addition, such elongated cassettes/apparatus can be heavy, and such weight can be increased if a grid is employed. That is, since the imaging area can be large, loss of clarity in the image can be an issue due to the x-ray beam being scattered. This scatter is frequently minimized by the use of a scatter absorbing grid. The method traditionally used by these grids to absorb x-ray beams not passing through the area of interest in a straight line, is to use a series of thin lead strips to absorb any deflected rays. An inherent property of lead is that it is one of the densest elements, and thus scatter absorbing grids tend to be very heavy. This large mass can result in their being difficult to move and carry from place to place by a user.

Another concern is that they can be easily damaged when dropped, due to their weight. The heaviness of the grid, coupled with the large, and thus heavier cassette/apparatus, can make it difficult for a user/radiologist to transport both items, which are often necessary to acquire an image. This can become an even greater detriment when the user is required to leave the radiology department to acquire an image in another part of the hospital, such as in a portable circumstance.

As indicated above, using a grid can minimize artifacts and distractions in the radiograph. The present invention is directed to reducing the difficulty in transporting the heavy grid, and employs a set of rollers and a handle to facilitate transport.

In one embodiment, the structure of the transport system of the present invention encases the grid in a radiographically translucent plastic that serves to protect the grid. The grid can include features that automatically align the grid to the image media housed within the cassette. These alignment features can serve to secure the cassette to the grid, allowing the cassette to be simultaneously transported with the grid, by means of the rollers, to ease the transport of the co-joined items.

Reference is now made to FIGS. 1 through 6 to more particularly describe a grid assembly 100 and its operation in accordance with the present invention.

Generally, grid assembly 100 includes a grid 1, a transport member 3, one or more rollers 4 to facilitate transport of the grid assembly. A preferred embodiment further includes a radiographically translucent enclosure 2, a recess feature 5, support members 6, a locking/securing mechanism 7, and a roller mount 8.

FIG. 1 shows a diagrammatic top perspective view of grid assembly 100. This orientation would commonly be used, i.e., wherein a patient would lie upon it, or be supported above it on an x-ray table, as well known to those skilled in the art.

Grids suitable for grid 1 are well known to those skilled in the art.

In a preferred embodiment, grid 1 is protected on all sides by radiographically translucent encasement/cover/enclosure 2. This enclosure can be comprised of a plastic or other polymer material, which is preferably durable and lightweight. It can provide a smooth surface for patient contact, and can also provide an area for guidance/reference markings (such as image receptor boundaries and image receptor centerlines) to be indicated. These markings can be used to facilitate placement of body parts in the image area.

Figure 2:
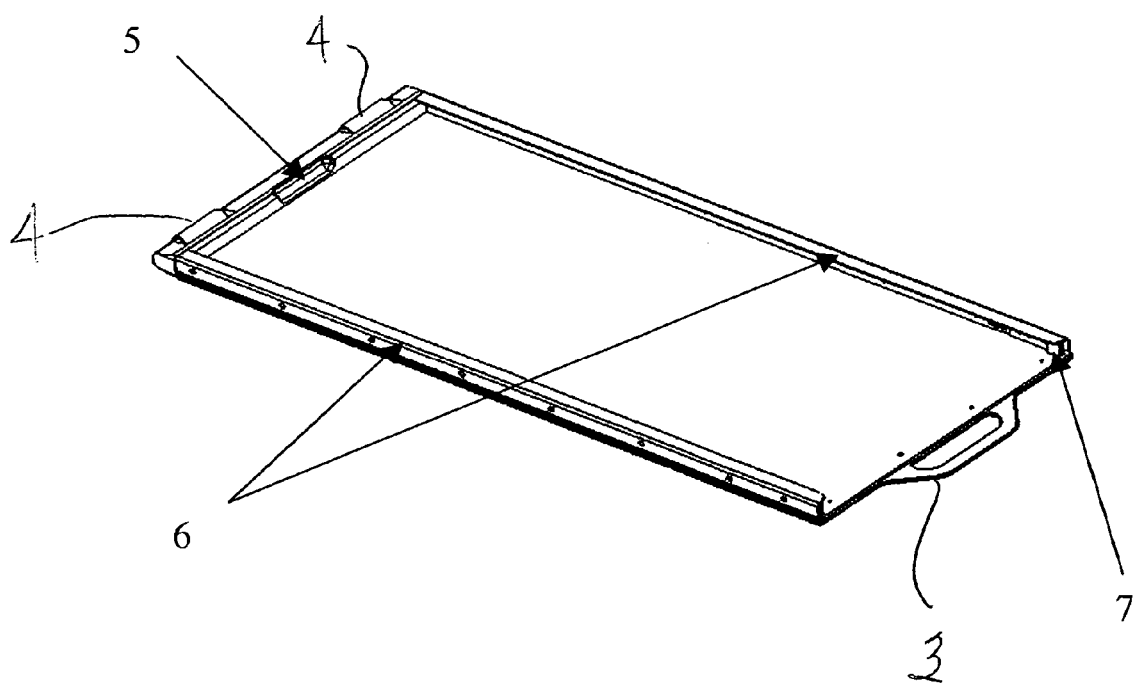
FIG. 2 shows a diagrammatic bottom perspective view of the grid assembly of FIG. 1.
Figure 4:
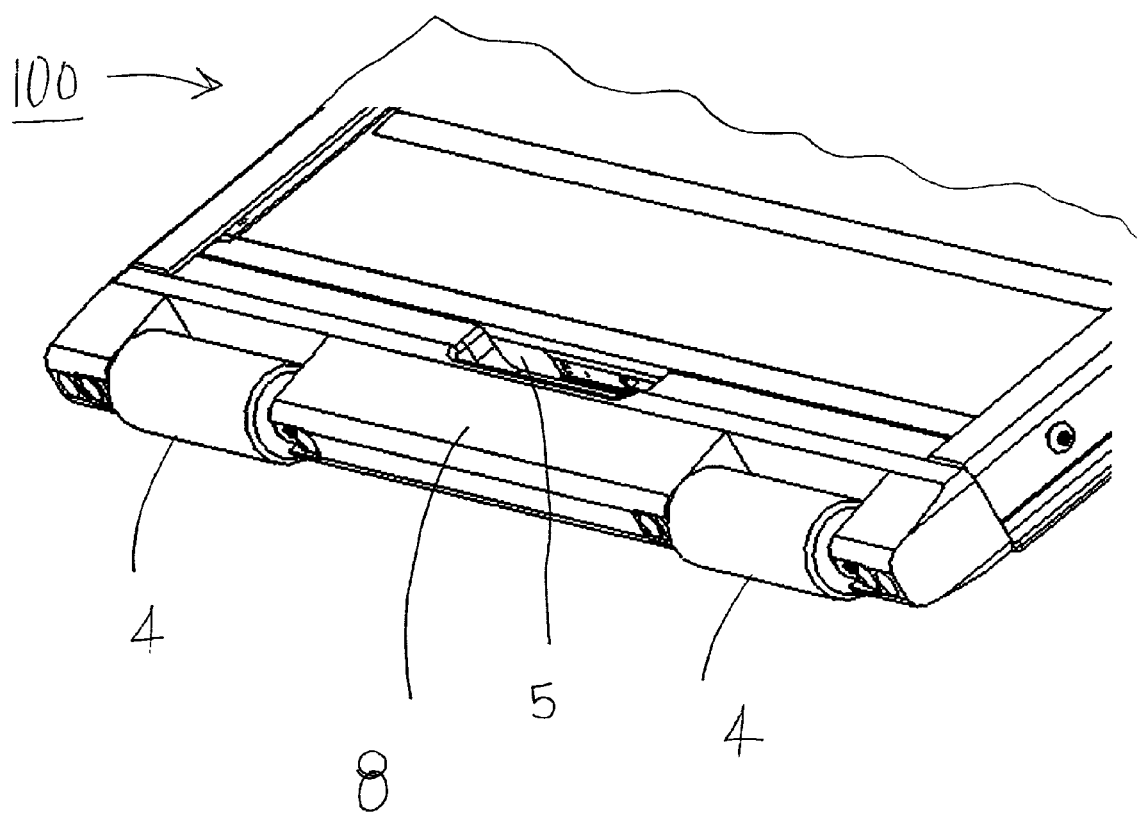
FIG. 4 shows a diagrammatic perspective view of a portion of the grid assembly.

Grid assembly includes transport member 3 attached at one end, which is shown in FIGS. 1–2 as a handle. Such a handle can be comprised of metal or plastic or other durable material. Transport member 3 can be attached directly to grid 1, but is preferably attached to enclosure 2. As best shown in FIG. 4, transport member 3 is used to facilitate rolling of grid assembly 100, in a manner similar to that of a wheeled suitcase. Transport member 3 is preferably thin in profile such that it will not become a hindrance should the assembly need to be positioned under a patient on a bed, gurney, or operating table.

Grid assembly 100 includes at least one roller. The roller can be attached directly to grid 1, though preferably is attached to enclosure 2. The roller is attached at an end of enclosure 2 opposite the end supporting transport member 3.

In a preferred embodiment, grid assembly includes two rollers 4 to allow easy transport. As is known to those skilled in the art, roller mount 8 can be employed to attach rollers 4 to enclosure 2.

Figure 3:
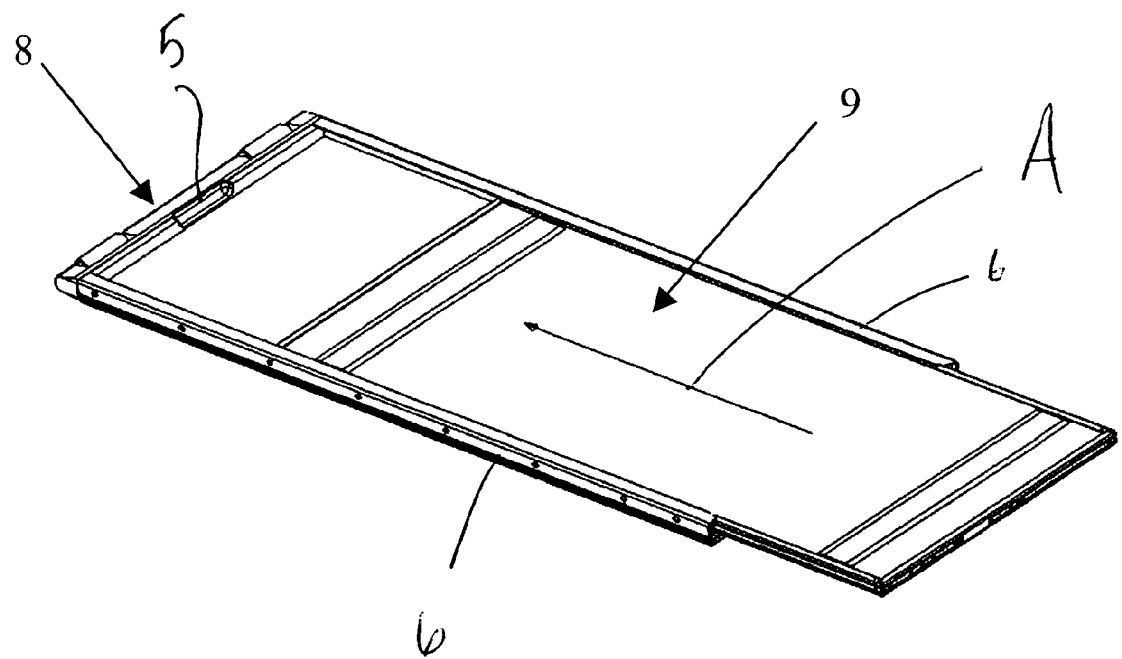
FIG. 3 shows a diagrammatic perspective view of a cassette being inserted into the grid assembly of FIGS. 1 and 2.

FIGS. 2 and 3 show a diagrammatic bottom perspective view of the grid assembly of FIG. 1. This figure best illustrates support members 6. Support members 6 can be disposed directly on grid 1, though are preferably disposed on enclosure 2. Support members 6 are shown in FIG. 2 as a pair of alignment rails adapted to form a mechanism for receiving and removably securing a cassette (e.g., a CR cassette comprising one or more CR plates). Generally, the support members form a slot into which the cassette is received; entry of the cassette into the slot disposed at the end closest the transport member. The rails are disposed on opposing sides of grid 1 or enclosure 2, disposed substantially perpendicular to the ends of the grid/enclosure supporting transport member 3 and rollers 4.

More particularly, support members 6 provide various functions. Support members 6 provide an alignment between grid 1 and the imaging media (e.g., film is conventional imaging or storage phosphor if CR) disposed within the cassette. Support members 6 also provide a means of removably securing the cassette to the grid/enclosure so that the cassette remains secure/stable, and in position for both transportation and image acquisition. Another function of support members 6 is to add structural stiffness to grid assembly 100, which helps to protect the grid, which is very susceptible to bending.

FIG. 2 illustrates optional locking mechanism 7. Locking mechanisms are known to those skilled in the art. Locking mechanism 7 is shown in FIG. 2 as a spring-loaded cassette lock. This locking mechanism can be mounted on a flexible, metal, cantilevered spring. A chamfer on a leading edge allows it to bend out of the way automatically when a cassette (shown as element 9 in FIG. 3) is inserted into support members 6 of grid assembly 100. When a cassette 9 has been located into position within support members 6, the lock can be snapped into place, thereby trapping/securing the cassette 9 until it is desired to remove the cassette from the grid assembly.

If the cassette is desired to be removed, locking mechanism 7 can be manually deflected using a user's thumb or single finger to free the cassette from the grid assembly.

As shown in FIGS. 2–4, roller mount 8 can include means for facilitating removal of the cassette from the support members. For example, roller mount can include recess feature 5 to facilitate in removal of the cassette. The recess feature can be sized sufficiently to allow entry of one or more user fingers into to push the cassette toward the end having the transport member 3, so as to allow removal of the cassette from the grid assembly.

Referring again to FIG. 3, FIG. 3 shows a diagrammatic perspective view of a cassette being inserted into the grid assembly. Cassette 9 is aligned to support member 6, and moved in the direction shown by arrow A. FIG. 3 shows locking mechanism 7 in a deflected arrangement so that it is out of the way and will remain so until the cassette comes into contact with roller mount 8. The cassette is slid into position by means of support members 6.

It is noted that the cassette (e.g., cassette 9 shown in FIG. 3) which can be supported by grid assembly 100 can be of various configurations known to those skilled in the art, including both conventional film cassettes and computed radiography cassettes. Examples of computed radiography cassettes include, but is not limited to, the CR cassettes shown and described in U.S. Pat. No. 6,852,987 (Steklenski), U.S. Pat. No. 6,744,062 (Brahm) (i.e., the elongated apparatus shown in Brahm's FIGS. 1–3), and U.S. Pat. No. 6,843,598 (Minnigh).

It is noted that a particular image being acquired may not require the use of a grid, such as in a situation wherein low dosage is deemed more important than improved image quality. In such a situation, the grid assembly of the present invention can still be of use. More particularly, the cassette can be inserted upside-down, the whole assembly can be inverted so that the grid is underneath the cassette, and images can be acquired without the grid being between the x-ray source and the imaging media. In this configuration, transport of the heavy cassette can still be enhanced, even if use of a grid is not desired.

More particularly, cassette 9 has a top surface and a bottom surface. In a preferred embodiment, cassette 9 can be received by support members 6 such that either the top surface or the bottom surface of the cassette is disposed adjacent enclosure 2. For example, in one arrangement, the top surface of cassette 9 is disposed adjacent enclosure 2 when use of grid 1 is desired when acquiring the image, and the bottom surface of cassette 9 is disposed adjacent enclosure 2 when use of grid 1 is not desired when acquiring the image.

The embodiment of the invention illustrated in the figures employs an encasement to protect a grid, and includes a built-in friction-reducing device such as a roller or skid to facilitate transporting the heavy grid. This has the added advantage of serving as a transport device for the heavy cassette, even if a grid is not required.

Figure 5:
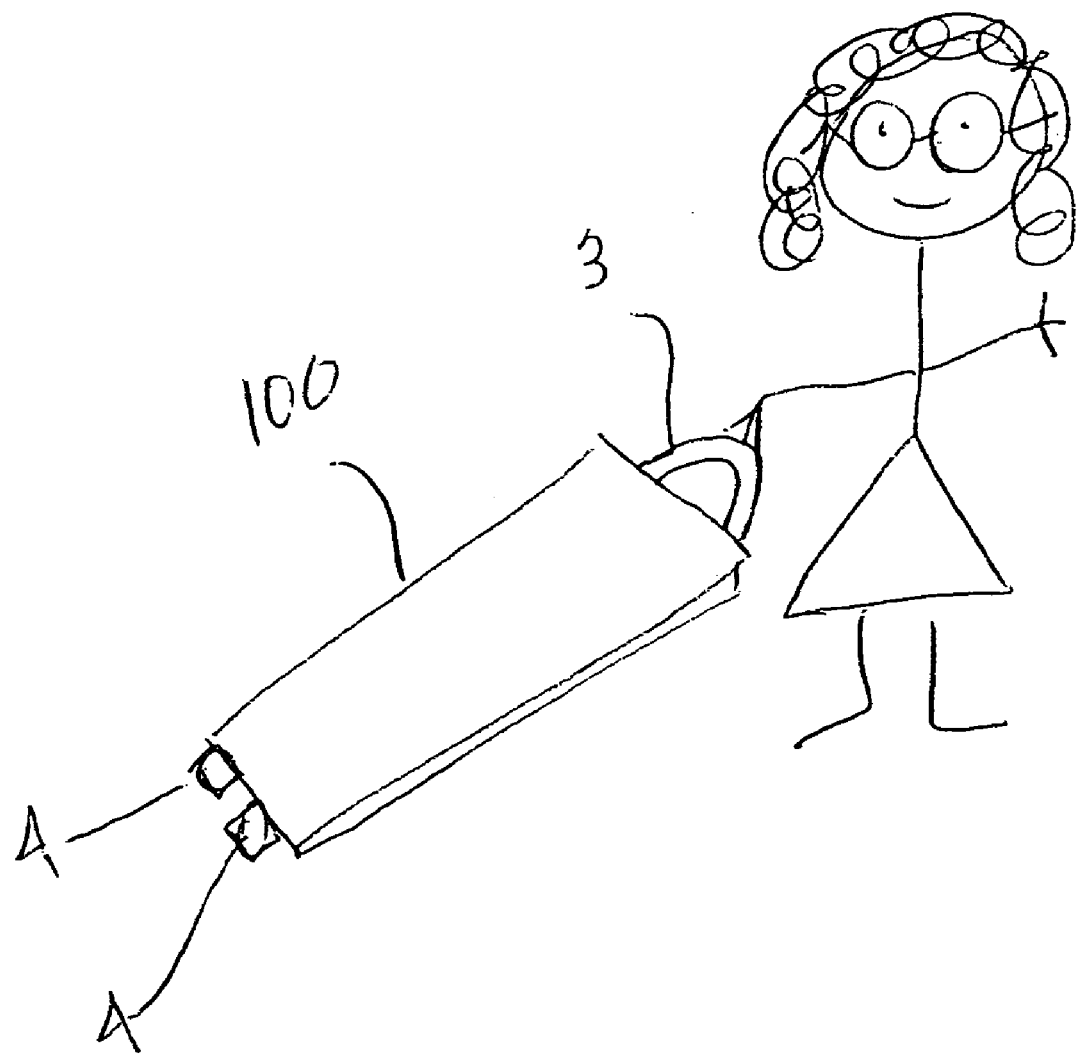
FIG. 5 shows a diagrammatic illustration of the transport of the grid assembly of FIGS. 1 and 2 by a user, with or without cassette.
Figure 6:
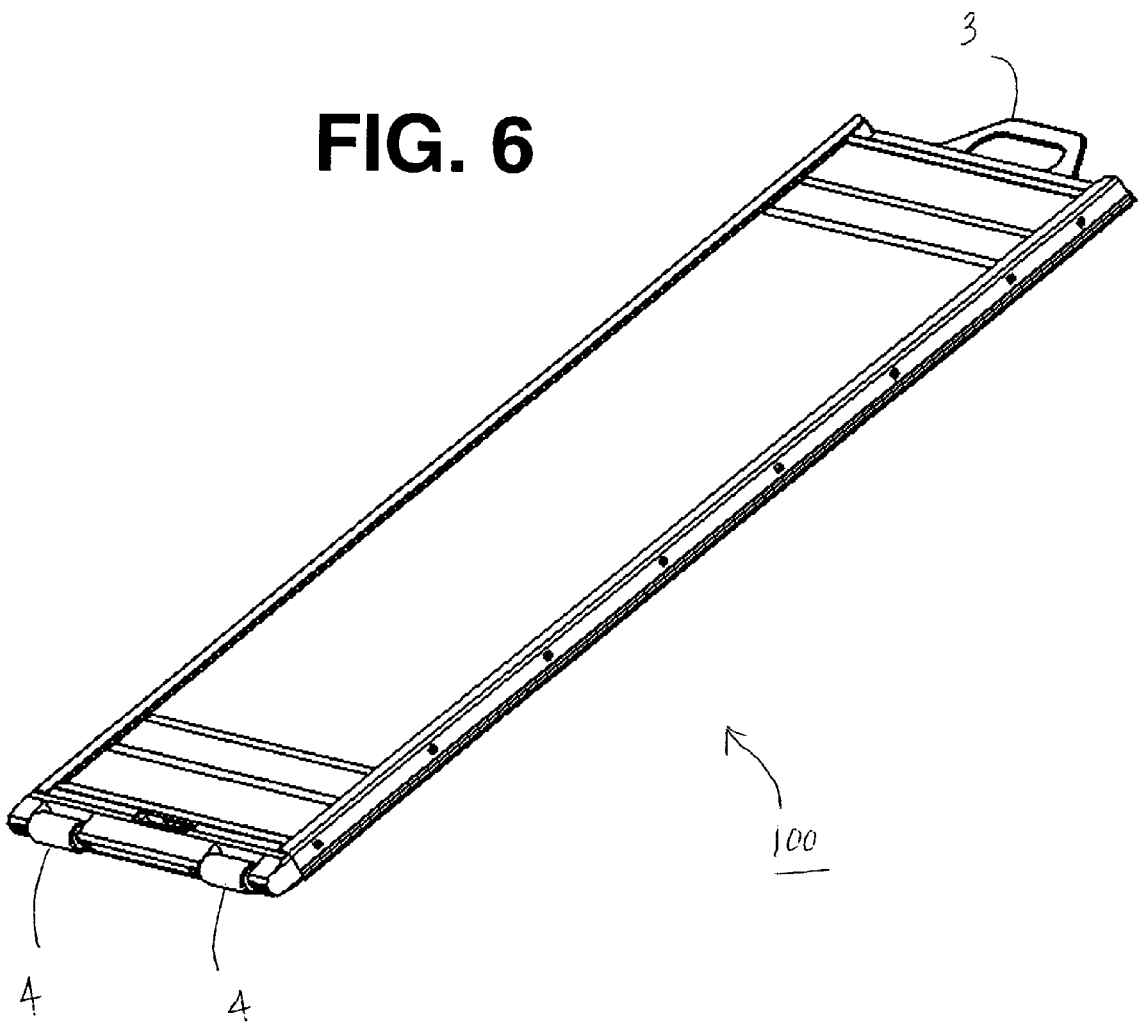
FIG. 6 shows a diagrammatic view of the grid assembly supporting a cassette, i.e., with a cassette inserted.

FIG. 5 provides an illustration of the transport of grid assembly 100 by an individual. As shown, member 3 of grid assembly 100 is grasped by a hand of the individual, whereby the grid assembly can be rolled along a base by rollers 4. As indicated above, this transport is similar to manner that of a wheeled suitcase. FIG. 6 provides a further illustration of grid assembly 100.

All documents, patents, journal articles and other materials cited in the present application are hereby incorporated by reference.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

PARTS LIST 100 grid assembly
1 grid
2 radiographically translucent enclosure
3 transport member; handle
4 roller(s)
5 recess for cassette removal in roller mount
6 support members; alignment rails
7 locking mechanism
8 roller mount
9 cassette; received by grid assembly

The invention claimed is:

1. A grid assembly for use with an imaging cassette, comprising:
   an anti-scatter grid having opposing first and second ends;
   a transport member disposed proximate the first end of the grid;
   at least one roller disposed at the second end of the grid to facilitate rolling transport of the grid assembly; and
   a pair of support members disposed on a surface of the grid in spaced relationship to form a slot having an opening proximate the first end of the grid adapted to removably slidably receive the imaging cassette adjacent the grid whereby the pair of support members secure the imaging cassette to the grid assembly.

2. A grid assembly for use with an imaging cassette, comprising:
   an anti-scatter grid;
   a radiographically translucent enclosure housing the anti-scatter grid and having a first end, a second end opposite the first end, and two sides;
   a transport member disposed at the first end of the enclosure;
   at least one roller disposed at the second end of the enclosure; and
   a receiving member supported externally by the enclosure and adapted to removably receive and support the imaging cassette.

3. The grid assembly of claim 2, wherein the receiving member comprises a pair of spaced support members, one support member disposed along each side of the enclosure to form a slot having an opening at the first end of the enclosure adapted to slidably receive the imaging cassette.

4. The grid assembly of claim 2, further comprising a locking mechanism for securing the cassette to the grid assembly when the cassette is received within the support members.

5. The grid assembly of claim 4, wherein the locking mechanism is a spring-loaded lock.

6. The grid assembly of claim 5, wherein the locking mechanism is disposed proximate the first end of the enclosure, and secures the cassette when the cassette is fully positioned by the support members.

7. The grid assembly of claim 2, further comprising a recess disposed proximate the second end of the enclosure to facilitate removal of the cassette from the grid assembly.

8. The grid assembly of claim 2, wherein the cassette has a top surface and a bottom surface, and the cassette is configured to be received by the receiving member such that either the top surface or the bottom surface is disposed adjacent the enclosure.

9. The grid assembly of claim 8, wherein the top surface of the cassette is disposed adjacent the enclosure when use of the grid to acquire the image is desired, and the bottom surface of the cassette is disposed adjacent the enclosure when use of the grid to acquire the image is not desired.

* * * * *